(12) United States Patent
Williams

(10) Patent No.: US 6,857,496 B2
(45) Date of Patent: Feb. 22, 2005

(54) VEHICLE STEERING APPARATUS WITH ANTI-STEER SECURITY DEVICE

(75) Inventor: Daniel Williams, West Lafayette, IN (US)

(73) Assignee: TRW Inc., Lyndhurst, OH (US)

( * ) Notice: Subject to any disclaimer, the term of this patent is extended or adjusted under 35 U.S.C. 154(b) by 32 days.

(21) Appl. No.: 10/234,013

(22) Filed: Sep. 3, 2002

(65) Prior Publication Data
US 2004/0129480 A1 Jul. 8, 2004

(51) Int. Cl.[7] .............................................. B60R 25/02
(52) U.S. Cl. ..................................... 180/287; 180/402
(58) Field of Search ................................. 180/287, 402, 180/446, 443; 701/41–43; 70/209, 237, 253, 252, 256; 74/492; B60R 25/02

(56) References Cited

U.S. PATENT DOCUMENTS

| | | | |
|---|---|---|---|
| 3,783,742 A | | 1/1974 | Kobelt |
| 4,749,873 A | * | 6/1988 | Mutoh et al. ............... 307/10.2 |
| 4,761,645 A | * | 8/1988 | Mochida ..................... 340/5.62 |
| 4,907,427 A | * | 3/1990 | Armstrong .................... 70/252 |
| 5,014,038 A | * | 5/1991 | Leigh-Monstevens et al. ......................... 340/430 |
| 5,152,363 A | | 10/1992 | Mertens et al. |
| 5,709,281 A | | 1/1998 | Sherwin et al. |
| 5,893,429 A | | 4/1999 | Hacki et al. |
| 6,041,887 A | * | 3/2000 | Kojo et al. .................. 180/446 |
| 6,072,248 A | * | 6/2000 | Muise et al. ............... 307/10.2 |
| 6,116,372 A | | 9/2000 | Mukai et al. |
| 6,223,852 B1 | | 5/2001 | Mukai et al. |
| 6,234,039 B1 | | 5/2001 | Garnault et al. |
| 6,268,790 B1 | * | 7/2001 | Cregeur .................... 340/425.5 |
| 6,272,947 B1 | | 8/2001 | Howard |
| 6,345,674 B1 | | 2/2002 | Eaton |
| 6,400,042 B1 | * | 6/2002 | Winner et al. ............. 307/10.5 |
| 6,501,370 B1 | * | 12/2002 | Rick ....................... 340/425.5 |
| 6,547,029 B2 | | 4/2003 | Peppler et al. |

FOREIGN PATENT DOCUMENTS

| | | | |
|---|---|---|---|
| DE | 19736651 | * | 8/1999 |
| DE | 199 40 323 A1 | * | 3/2001 |
| DE | 10046167 | | 5/2001 |
| EP | 630800 A1 | * | 12/1994 |
| EP | 1234734 A1 | * | 8/2002 |
| JP | 07277142 A | * | 10/1995 |
| JP | 3125651 B2 | * | 11/2000 |
| JP | 2002-495995 | * | 6/2002 |
| WO | 02/40336 | | 3/2002 |

* cited by examiner

Primary Examiner—Ruth Ilan
(74) Attorney, Agent, or Firm—Tarolli, Sundheim, Covell & Tummino L.L.P.

(57) ABSTRACT

A steering apparatus (10) comprises a steering feel motor (14) that is operatively connected to a steering shaft (16) of the vehicle (12). A sensor (20) detects operator applied steering inputs to the steering shaft (16) and outputs a steering signal indicative of the monitored operator applied steering inputs. A controller (28) receives the steering signal and, in response to the received steering signal, controls energization of the steering feel motor (14). A security device (38) is operatively connected to the controller (28) and is actuatable for providing a lock steering signal to the controller (28). The controller (28), in response to the lock steering signal, enters a lock steering mode in which the controller (28) controls energization of the steering feel motor (14) to counterbalance all operator applied steering inputs and thereby prevent steering of the vehicle (12).

27 Claims, 6 Drawing Sheets

US 6,857,496 B2

VEHICLE STEERING APPARATUS WITH ANTI-STEER SECURITY DEVICE

TECHNICAL FIELD

The present invention relates to a vehicle steering apparatus and a method of operating the steering apparatus. More particularly, the present invention relates to a vehicle steering apparatus with an anti-steer security device and a method of operating the steering apparatus with the anti-steering security device.

BACKGROUND OF THE INVENTION

U.S. Pat. No. 5,709,281 illustrates a vehicle steering apparatus. The vehicle steering apparatus includes a steering feel motor and a controller. A torque sensor provides the controller with a signal indicative of driver applied torque to the vehicle handwheel. A driver characteristic sensor provides the controller with a signal indicative of a driver characteristic, such as drowsiness. Vehicle condition sensors provide vehicle condition signals, such as vehicle speed and lateral acceleration, to the controller. In response to the received signals, the controller controls the steering feel motor to provide a determined steering feel to the handwheel during steering operation of the vehicle.

A typical security system for a vehicle prevents ignition of the vehicle engine until a proper security code is received. Some vehicle security systems are also capable of receiving remote signals and, in response to receiving a proper remote signal, shut down or kill the vehicle engine.

SUMMARY OF THE INVENTION

The present invention relates to a steering apparatus for a vehicle. The steering apparatus comprises a steering feel motor that is operatively connected to a steering shaft of the vehicle. The steering apparatus also comprises a sensor for detecting operator applied steering inputs to the steering shaft and for outputting a steering signal indicative of the monitored operator applied steering inputs. A controller receives the steering signal and, in response to the received steering signal, controls energization of the steering feel motor. The steering apparatus still further comprises a security device that is operatively connected to the controller and is actuatable for providing a lock steering signal to the controller. The controller, in response to the lock steering signal, enters a lock steering mode in which the controller controls energization of the steering feel motor to counterbalance all operator applied steering inputs and thereby prevent steering of the vehicle.

According to another aspect, the present invention relates to a method of operating a steering apparatus. During the method, operator applied steering inputs to a steering shaft are detected. A steering signal that is indicative of the monitored operator applied steering inputs is provided to a controller. Energization of a steering feel motor is controlled in response to the received steering signal. A lock steering signal is provided to the controller in response to actuation of a security device. In response to the lock steering signal, a lock steering mode is entered. In the lock steering mode, the controller controls energization of the steering feel motor to counterbalance all operator applied steering inputs and thereby prevent steering of the vehicle.

BRIEF DESCRIPTION OF THE DRAWINGS

The foregoing and other features of the present invention will become apparent to those skilled in the art to which the present invention relates upon reading the following description with reference to the accompanying drawings, in which.

DETAILED DESCRIPTION OF THE INVENTION

Figure 1:
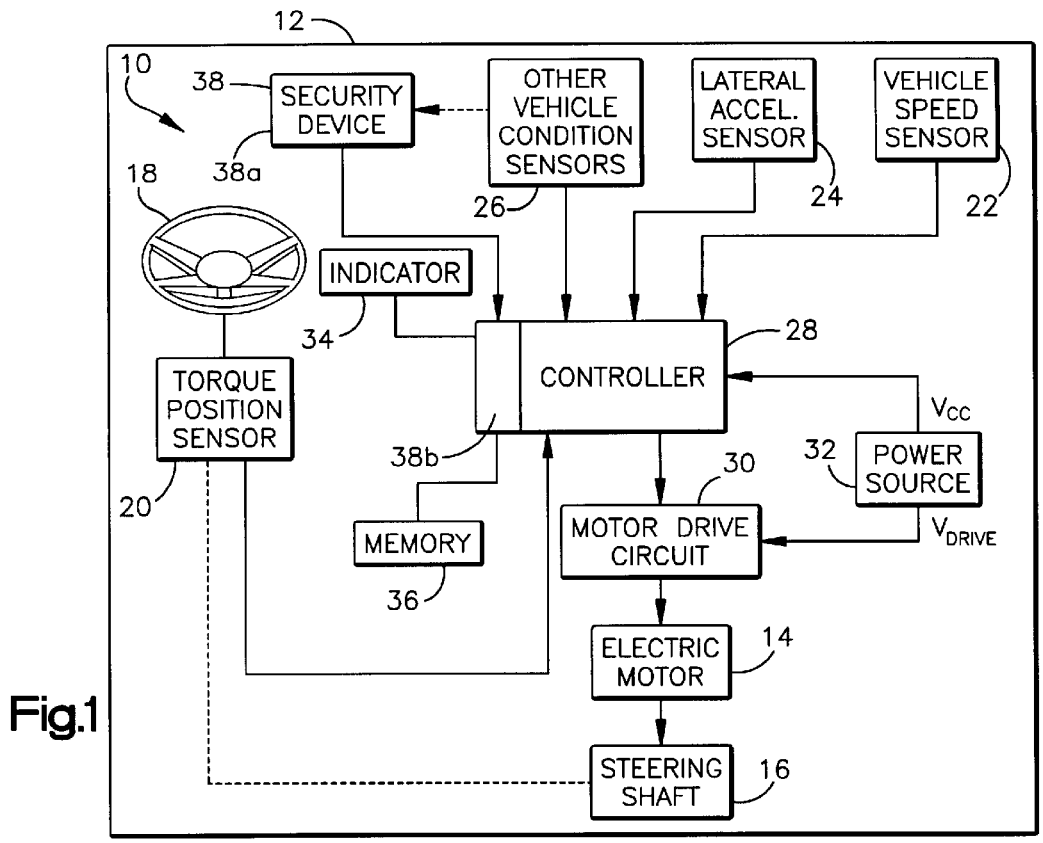
FIG. 1 is a schematic block diagram of a vehicle steering apparatus constructed in accordance with the present invention.

FIG. 1 schematically illustrates a vehicle steering apparatus 10 constructed in accordance with the present invention. The vehicle steering apparatus 10 is mountable within a vehicle 12. The vehicle steering apparatus 10 includes a steering feel motor 14. The steering feel motor 14 may be a separate motor or may be a power assist motor.

The steering feel motor 14 is operatively connected to a steering shaft 16 of the vehicle 12. Preferably, a gear assembly (not shown) connects an output of the steering feel motor 14 to the steering shaft 16. The steering shaft 16 is operatively connected to a vehicle handwheel 18 through a torque/position sensor 20.

The torque/position sensor 20 is operable to sense operator applied steering inputs, such as torque and angular rotation of the handwheel 18. The torque/position sensor 20, in response to sensing operator applied steering inputs, generates a steering signal that is indicative of the operator applied steering inputs. The torque/position sensor 20 may be any known sensor or group of sensors for sensing applied torque and angular rotation of the handwheel 18 and for generating signals indicative of the sensed parameters. In one embodiment, the torque/position sensor 20 is an optical sensor.

The vehicle steering apparatus 10 also includes a plurality of vehicle condition sensors. A vehicle speed sensor 22 is operable to sense the speed of the vehicle and to provide a vehicle speed signal indicative of the vehicle speed. A lateral acceleration sensor 24 is operable to sense the lateral acceleration of the vehicle and to provide a lateral acceleration signal indicative of the sensed lateral acceleration.

The vehicle steering apparatus also includes other vehicle condition sensors 26. In a preferred embodiment of the invention, the other vehicle condition sensors 26 include a vehicle ignition sensor that indicates the position of the vehicle ignition. For example, if the vehicle ignition is in an OFF position, the vehicle ignition sensor provides a vehicle ignition signal indicating the OFF position of the vehicle ignition. Likewise, if the vehicle ignition is in a run or ON position, the vehicle ignition sensor provides a vehicle ignition signal indicating the ON position of the vehicle ignition.

Also, the other vehicle condition sensors 26 may include a vehicle transmission position sensor for sensing the position into which the vehicle transmission is engaged and for providing a transmission position signal indicative of the sensed transmission position. For example, if the transmission is in PARK, the transmission position sensor provides a transmission position signal indicating the position of the transmission in PARK. Likewise, if the transmission is in DRIVE, the transmission position sensor provides a transmission position signal indicating the position of the transmission in DRIVE.

The vehicle steering apparatus 10 also includes a controller 28. The controller 28 is preferably a microcomputer. The controller 28 is operatively connected to and receives signals from the torque/position sensor 20, the vehicle speed sensor 22, the lateral acceleration sensor 24, and the other vehicle condition sensors 26. The controller 28 is responsive to the received signals to provide a control signal to control energization of the steering feel motor 14.

The controller 28 is operatively connected to the steering feel motor 14 through a motor drive circuit 30. The motor drive circuit 30 is electrically connected to a power source 32 and receives a drive voltage $V_{DRIVE}$ from the power source. The motor drive circuit 30 is also connected to the steering feel motor 14. In accordance with the control signal received from the controller 28, the motor drive circuit 30 energizes the steering feel motor 14.

The power source 32 preferably includes the vehicle battery and power regulating devices. In addition to providing the drive voltage $V_{DRIVE}$ to the motor drive circuit 30, the power source 32 also provides a regulated control voltage $V_{CC}$ to the controller 28.

An indicator device 34 is operatively connected to the controller 28. The indicator device 34 receives indicator signals provided by the controller 28 and, in response to an indicator signal, provides an operator perceptible message. Preferably, the indicator device 34 is an alphanumeric display that provides text messages that are viewable by the operator of the vehicle 12.

A nonvolatile memory 36 is also operatively connected to the controller 28. Alternatively, the memory 36 may form an integral portion of the controller 28. The memory 36 stores at least one of a reference lock steering identification code and a reference unlock steering identification code. The memory 36 may also store other vehicle steering information, such as drive mode and lock steering mode look-up tables.

The steering apparatus 10 also includes a security device 38. The security device 38 is operatively connected to the controller 28. In one embodiment of the invention, the security device 38 receives a vehicle condition signal from the other vehicle condition sensors 26. In that one embodiment, the other vehicle condition sensors 26 may be directly connected to the security device 38, as is shown in phantom in FIG. 1, or the security device 38 may be connected to the other vehicle condition sensors 26 through the controller 28.

Figure 2A:
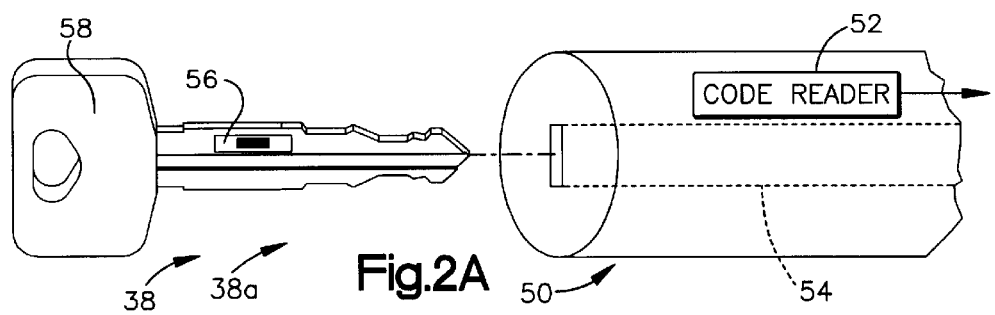
FIGS. 2A–2C illustrate alternative structures of a security device of the vehicle steering apparatus of FIG. 1.
Figure 2B:
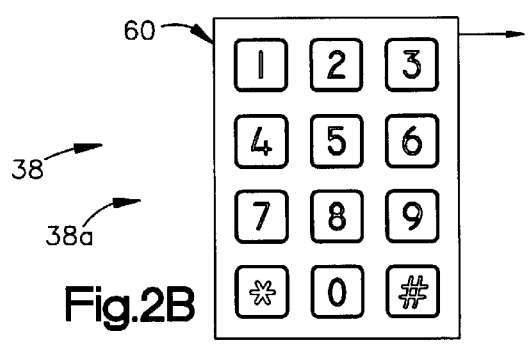
Figure 2C:
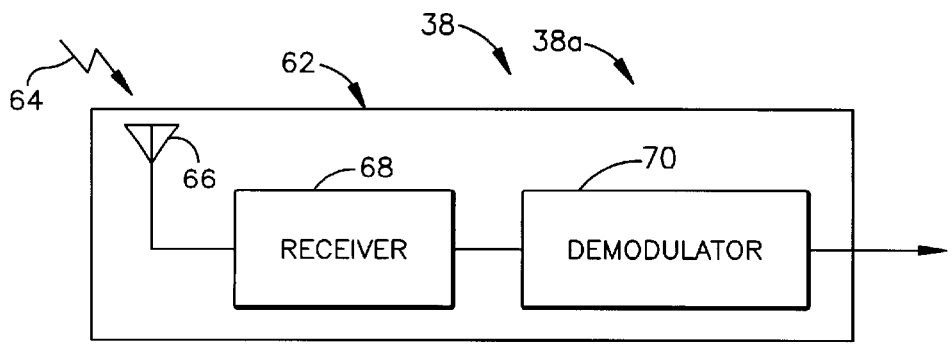

The security device 38 is actuatable to provide a lock steering signal and an unlock steering signal to the controller 28. The security device 38 includes a code-receiving portion 38a for receiving an identification code and a comparator portion 38b for comparing the received identification code to at least one of the reference lock steering identification code and the reference unlock steering identification code. FIGS. 2A–2C illustrate structures that may be used to form the code-receiving portion 38a of the security device 38. As shown in FIG. 1, the comparator portion 38b of the security device 38 is integral with the controller 28. Alternatively, the security device 38 may include a separate microcomputer (not shown) which forms the comparator portion 38b. When the security device 38 includes a separate microcomputer, the reference lock steering identification code and the reference unlock steering identification code, when both are stored, are stored in a non-volatile memory (not shown) associated with the microcomputer of the security device 38.

The code-receiving portion 38a of the security device 38 illustrated in FIG. 2A is a key receiving portion 50 of a vehicle ignition system. The key receiving portion 50 includes a code reader 52 that is attached adjacent the key channel 54. The code reader 52 is configured to receive an identification code from a code carrying portion 56 of a key 58 and to provide the received identification code to the comparator portion 38b of the security device 38. The comparator portion 38b of the security device 38 compares the received identification code to the reference unlock steering code and, if the received identification code matches the reference unlock steering identification code, provides the unlock steering signal to the controller 28. In the absence of the key 58 or if the received identification code fails to match the reference unlock steering identification code, the security device 38 provides the lock steering signal to the controller 28.

The code-receiving portion 38a of the security device 38 illustrated in FIG. 2B is a keypad having twelve push buttons or keys for entering data. The twelve keys include a key for each of the ten digits zero (0) through nine (9) and two wildcard keys, one with an asterisk (*) and the other with a number sign (#). The keypad 60 is configured to receive identification codes entered by an operator and to provide the received identification codes to the comparator portion 38b of the security device 38. The comparator portion 38b of the security device 38 compares the identification code received by the keypad 60 to the reference lock steering identification code and the reference unlock steering identification code. In the event that the received identification code matches the reference lock steering identification code, the security device 38 provides the lock steering signal to the controller 28. In the event that the received identification code matches the reference unlock steering identification code, the security device 38 provides the unlock steering signal to the controller 28.

The code-receiving portion 38a of the security device 38 illustrated in FIG. 2C is a signal receiving device 62 for receiving an transmission signal 64 that includes an identification code. The transmission signal 64 received at the signal receiving device 62 may originate from a source that is remote from the vehicle 12 (e.g., a key fob, a dispatcher center, etc). The signal receiving device 62 includes an antenna 66 and a receiver 68 for receiving the signal 64. Preferably, the transmission signal 64 is a radio frequency (RF) signal and the antenna 66 and receiver 68 are configured to receive the RF signal 64. The receiver 68 is operatively connected to a demodulator 70. The demodulator 70 extracts the identification code from the received transmission signal 64 and provides the received identification code to the comparator portion 38b of the security device 38. The comparator portion 38b of the security device 38 compares the identification code to the reference lock steering identification code and the reference unlock steering identification code. In the event that the received identification code matches the reference lock steering identification code, the security device 38 provides the lock steering signal to the controller 28. In the event that the received identification code matches the reference unlock steering identification code, the security device 38 provides the unlock steering signal to the controller 28.

Figure 3:
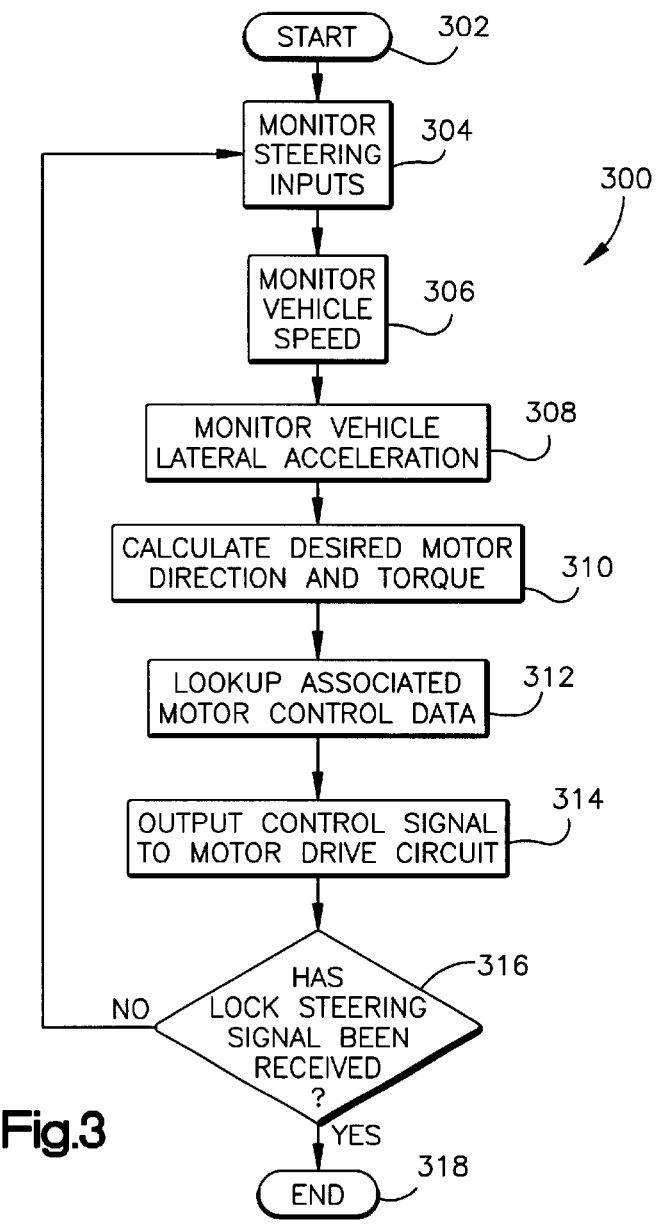
FIG. 3 is a flow diagram illustrating an exemplary control process performed by a steering apparatus constructed in accordance with the present invention when operating in a drive mode.

The controller 28 has two modes of operation; a drive mode and a lock steering mode. The flow diagram of FIG. 3 illustrates an exemplary control process 300 that may be performed by the controller 28 of the steering apparatus 10 when operating in the drive mode. The process 300 begins at step 302 in which the controller 28 is initialized, memories are cleared and set to initial values, flags are set to initial conditions, etc. At step 304, the controller 28 monitors the steering signal received from the torque/position sensor 20 to determine the operator applied steering inputs. At step 306, the controller 28 monitors the vehicle speed sensor 22 for the vehicle speed signal, and at step 308, the controller 28 monitors the lateral acceleration sensor 24 for the lateral acceleration signal. The process 300 then proceeds to step 310 in which the desired steering feel motor 14 direction and torque are calculated. The desired steering feel motor 14 direction and torque are calculated using a known algorithm and the data received from the steering signal, the vehicle speed signal, and the lateral acceleration signal. The process 300 then proceeds to step 312.

At step 312, the controller 28 accesses the drive mode lookup table stored in memory 36 to determine motor control data associated with the desired steering feel motor direction and torque. In response to determining the associated motor control data, the controller 28, at step 314, outputs a control signal that includes the associated motor control data to the motor drive circuit 30.

The process 300 then proceeds to step 316 in which a determination is made as to whether the controller 28 has received the lock steering signal from the security device 38. If the determination at step 316 is negative, the process 300 returns to step 304. If the determination at step 316 is affirmative, the process 300 proceeds to step 318 and the controller 28 enters the lock steering mode.

When the controller 28 is operating in the drive mode, the control signal received from the controller 28 controls the motor drive circuit 30 to provide the electrical energy necessary for the steering feel motor 14 to provide the desired torque in the desired direction. As a result of the provided electrical energy, the steering feel motor 14 acts on the steering shaft 16 of the vehicle steering apparatus 10 to provide a predefined feel to the handwheel 18 during steering operation of the vehicle 12.

Figures 4, 6:
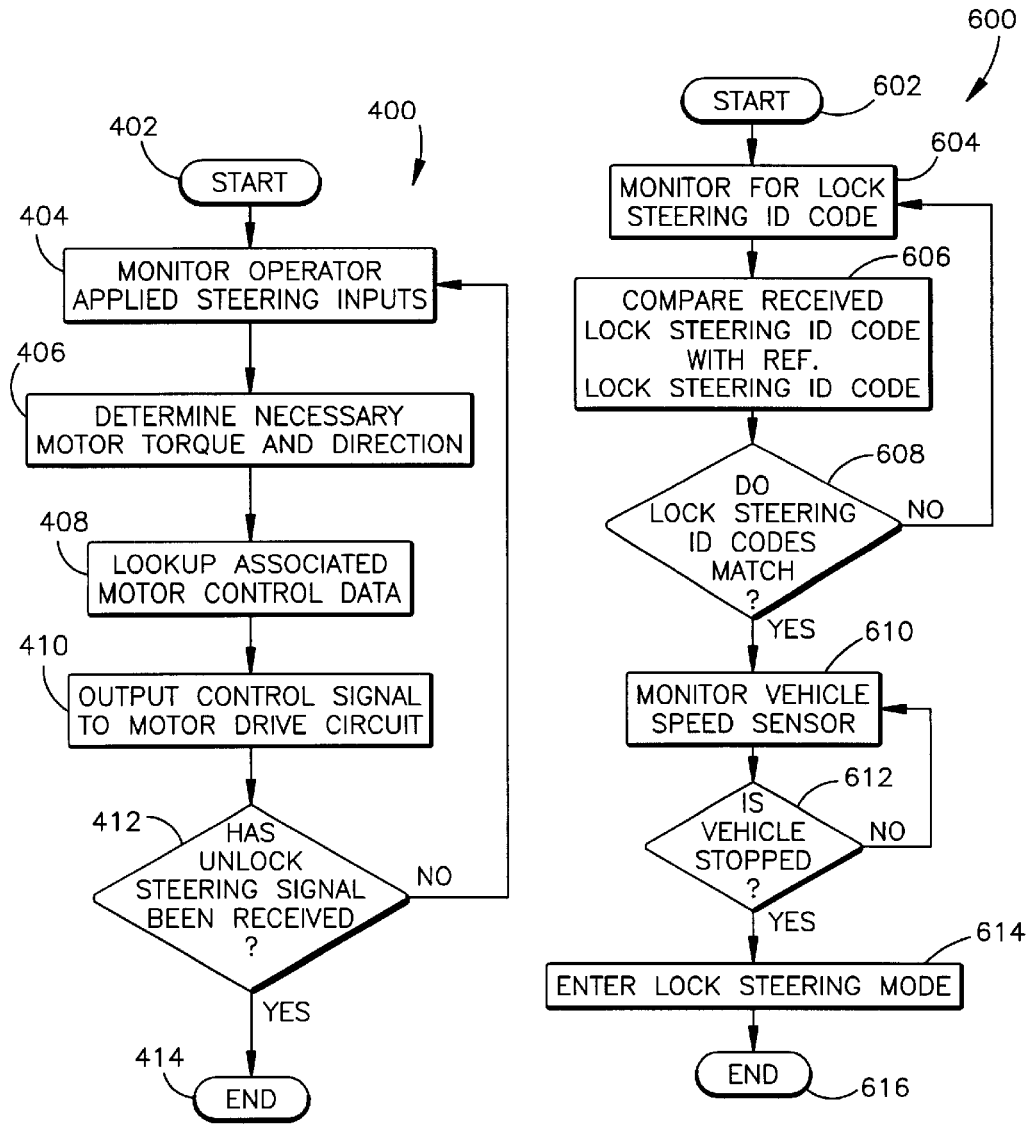
FIG. 4 is a flow diagram illustrating an exemplary control process performed by a steering apparatus constructed in accordance with the present invention when operating in a lock steering mode.
FIG. 6 is a flow diagram illustrating an exemplary control process that may be performed by a steering apparatus constructed in accordance with the present invention when entering a lock steering mode from a drive mode.

The flow diagram of FIG. 4 illustrates an exemplary control process 400 that may be performed by the controller 28 of the steering apparatus 10 when operating in the lock steering mode. The process 400 begins at step 402 in which the controller 28 is initialized, memories are cleared and set to initial values, flags are set to initial conditions, etc. At step 404, the controller 28 monitors the steering signal received from the torque/position sensor 20 to determine the operator applied steering inputs. The process 400 then proceeds to step 406.

At step 406, the controller 28 determines the steering feel motor torque and direction of applying the torque necessary to counterbalance all of the operator applied steering inputs. When counterbalancing the operator applied steering inputs, the steering feel motor torque and direction are sufficient prevent rotation of the steering shaft 16 away from the zero angle position. In the zero steering angle position, the steerable wheels of the vehicle 12 are positioned to move the vehicle along a straight line. In the event that the steering shaft 16 is away from the zero steering angle, the steering feel motor torque and direction may be sufficient to prevent rotation of the steering shaft 16 from its current location or, alternatively, the steering feel motor torque and direction may be sufficient to rotate the steering shaft 16 back to a zero steering angle position and thereafter, to prevent rotation of the steering shaft 16. Thus, at step 406, the controller 28 determines the steering feel motor torque and direction of applying the torque necessary to prevent steering of the vehicle 12. At step 408, the controller 28 accesses the lock steering lookup table stored in memory 36 to determine motor control data associated with the determined steering feel motor 14 direction and torque necessary to counterbalance the driver applied steering inputs. In response to determining the associated motor control data, the controller 28, at step 410, outputs a control signal that includes the associated motor control data to the motor drive circuit 30.

The process 400 then proceeds to step 412 in which a determination is made as to whether the controller 28 has received the unlock steering signal from the security device 38. If the determination at step 412 is negative, the process 400 returns to step 404. If the determination at step 412 is affirmative, the process 400 proceeds to step 414 and the controller 28 exits the lock steering mode.

When the controller 28 is operating in the lock steering mode, the control signal provided by the controller 28 controls the motor drive circuit 30 to provide the electrical energy necessary for the steering feel motor 14 to counterbalance all operator applied steering inputs. As a result of the provided electrical energy, the steering feel motor 14 acts on the steering shaft 16 of the vehicle steering apparatus 10 to prevent steering of the vehicle 12.

Figure 5:
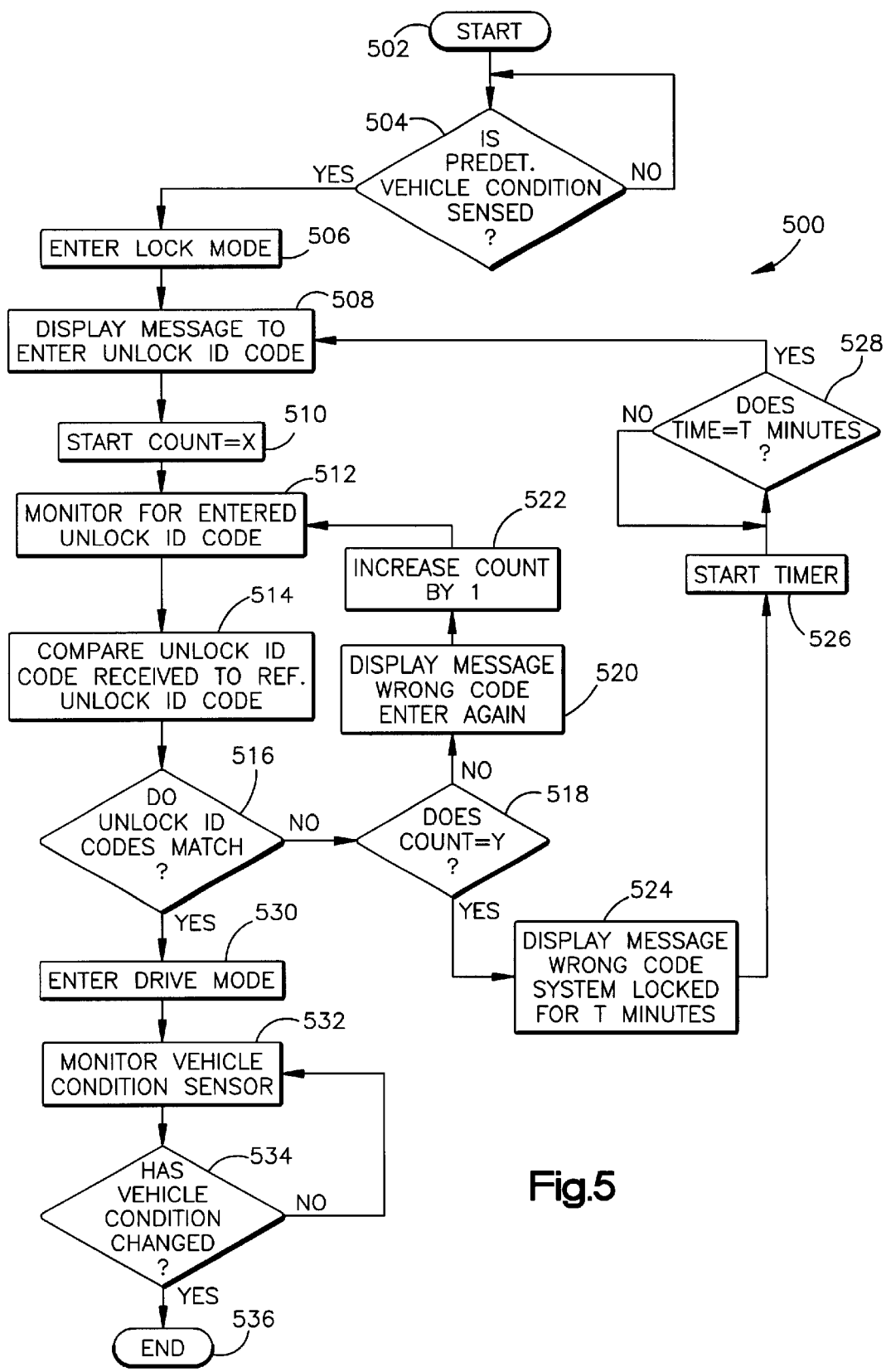
FIG. 5 is a flow diagram illustrating an exemplary control process which may be performed by a steering apparatus constructed in accordance with the present invention when switching between a lock steering mode and a drive mode.

FIG. 5 is a flow diagram illustrating an exemplary control process 500 that may be performed by the steering apparatus 10 of the present invention when switching between the lock steering mode and the drive mode. In the exemplary process 500 of FIG. 5, the lock steering mode is a default mode for controller 28. The process 500 begins at step 502 in which the controller 28 is initialized, memories are cleared and set to initial values, flags are set to initial conditions, etc. At step 504, a determination is made as to whether the other vehicle condition sensors 26 sense a predetermined condition. For example, when the other vehicle condition sensors 26 include a vehicle ignition sensor, the predetermined condition may be the vehicle ignition being in the ON position. If the other vehicle condition sensors 26 include the vehicle transmission position sensor, the predetermined condition may be positioning of the transmission in DRIVE. If the determination at step 504 is negative and the predetermined condition is not sensed, the process 500 loops back upon itself until the predetermined condition is sensed. When the determination at step 504 is affirmative and the predetermined condition is sensed, the controller 28 indicates the sensed predetermined condition to the security device 38 and the security device is actuated to provide the lock steering signal to the controller 28. Step 504 may be performed entirely within the controller 28 when a portion of the security device 38 is integral with the controller. The process 500 proceeds to step 506.

Alternatively, the other vehicle condition sensors 26 may be connected directly to the security device 38. When the other vehicle condition sensors 26 are connected directly to the security device 38, the determination of the predetermined condition is made within the security device. When the security device determines that the predetermined condition is sensed, the security device provides the lock steering signal to the controller 28. Thus, at step 504, when the predetermined vehicle condition is sensed, the security device 38 is actuated to send the lock steering signal to the controller 28. At step 506, the controller 28 enters the lock steering mode, i.e., the default mode for the controller 28.

At step 508, the controller 28 outputs an indicator signal to the indicator device 34 causing the indicator device to display the message "ENTER UNLOCK STEERING IDENTIFICATION CODE". The process 500 then proceeds to step 510 and a count is started. The count is indicated as being started with a value of X. Preferably, the count is started with a value of one. The process 500 then proceeds to step 512. At step 512, the controller 28 monitors for an entered unlock steering identification code. As described above with reference to FIGS. 2A–2C, the unlock steering identification code may be entered or received by the steering apparatus 10 in a number of ways. When an unlock steering identification code is received, the process 500 proceeds to step 514 in which the controller 28 compares the received unlock steering identification code to the reference unlock steering identification code that is stored in memory 36.

At step 516, a determination is made as to whether the received unlock steering identification code matches the reference unlock steering identification code. If the determination at step 516 is negative, the process 500 proceeds to step 518. At step 518, a determination is made as to whether the count equals a predetermined value, indicated as Y. In one embodiment, the predetermined value indicated as Y is three. If the determination at step 518 is negative and the count is below the predetermined value Y, the process 500 proceeds to step 520. At step 520, the controller 28 outputs an indicator signal to the indicator device 34 causing the indicator device to display the message "WRONG CODE, ENTER CODE AGAIN". The process 500 then proceeds to step 522 and the count is increased by one. From step 522, the process 500 returns to step 512.

If the determination at step 518 is affirmative and the count equals the predetermined value Y, e.g., three, the process 500 proceeds to step 524. At step 524, the controller 28 outputs an indicator signal to the indicator device 34 causing the indicator device to display the message "WRONG CODE, SYSTEM LOCKED FOR T MINUTES". The process 500 then proceeds to step 526 in which a timer is started. From step 526, the process 500 proceeds to step 528 in which a determination is made as to whether the time on the timer equals a predetermined time indicated as T minutes. In one embodiment, the predetermined time is five minutes. If the determination at step 528 is negative, the process 500 loops back upon itself until an affirmative determination is made at step 528. If the determination at step 528 is affirmative the process 500 returns to step 508. By locking the controller's ability to receive and compare identification codes for a predetermined time after receiving a predetermined number, i.e., 3, of successive wrong identification codes, unlocking of the apparatus 10 by randomly entering codes is deterred.

Returning to step 516, if the determination is affirmative, the process 500 proceeds to step 530 and the controller 28 enters the drive mode. The process 500 then proceeds to step 532 and the other vehicle condition sensors 26 are again monitored. At step 534, a determination is made as to whether the vehicle condition has changed. For example, the ignition system is no longer in the ON position or the vehicle transmission is no longer in DRIVE. If the determination at step 534 is negative, the controller 28 remains in the drive mode and the process 500 loops back to step 532. If the determination at step 534 is affirmative, the process 500 proceeds to step 536 and the process ends. The control process 500 for the steering apparatus 10 of the present invention may be used to deter vehicle theft by preventing steering of the vehicle 12 until an authorized unlock steering identification code is received.

FIG. 6 is a flow diagram illustrating another exemplary control process 600 that may be performed by the steering apparatus 10 of the present invention. The control process 600 of FIG. 6 illustrates the controller 28 entering a lock steering mode from the drive mode. The process 600 begins at step 602 in which the controller 28 is initialized, memories are cleared and set to initial values, flags are set to initial conditions, etc. At step 604, the controller 28, which is currently operating in the drive mode, monitors for a lock steering identification code. At step 606, the controller 28 compares a received lock steering identification code to a reference lock steering identification code that is stored in memory 36. At step 608, a determination is made as to whether the received lock steering identification code matches the reference lock steering identification code. If the determination at step 608 is negative, the process 600 returns to step 604. If the determination at step 608 is affirmative, the process 600 proceeds to step 610.

At step 610, the controller 28 monitors the vehicle speed sensor 22. At step 612, the controller 28 determines whether the vehicle 12 is stopped. If the controller 28 determines that the vehicle 12 is in motion, the determination at step 612 is negative and the process 600 loops back to step 610. If the controller 28 determines that the vehicle 12 is stopped, the determination at step 612 is affirmative and the process 600 proceeds to step 614 in which the controller 28 enters the lock steering mode. The process 600 then ends at step 616.

The control process 600 of FIG. 6 is most likely used in combination with the signal receiving device 62 illustrated in FIG. 2C for receiving a lock steering signal that originates from a source remote from/the vehicle 12. Such a combination allows, for example, a dispatcher for a trucking company to lock the steering on a vehicle 12 from a remote dispatch center. By monitoring the vehicle speed and entering the lock steering mode only after the vehicle 12 is stopped, the control process 600 of FIG. 6 enables safe operation and control of the vehicle 12 by the vehicle operator when the lock steering signal is received while the vehicle 12 is in motion.

The control process 600 of FIG. 6 may be combined with the control process 500 of FIG. 5. Preferably, if the control process 600 of FIG. 6 is combined with the control process 500 of FIG. 5, the steps illustrated in FIG. 6 are performed in parallel to steps 532 and 534 of FIG. 5.

As described herein, the steering apparatus 10 of the present invention may be used to prevent steering of a vehicle until an authorized steering unlock identification code is received. Additionally, the steering apparatus 10 may be used lock the steering operation, i.e., prevent further steering, of a vehicle 12 that is current being operated.

Figure 7:
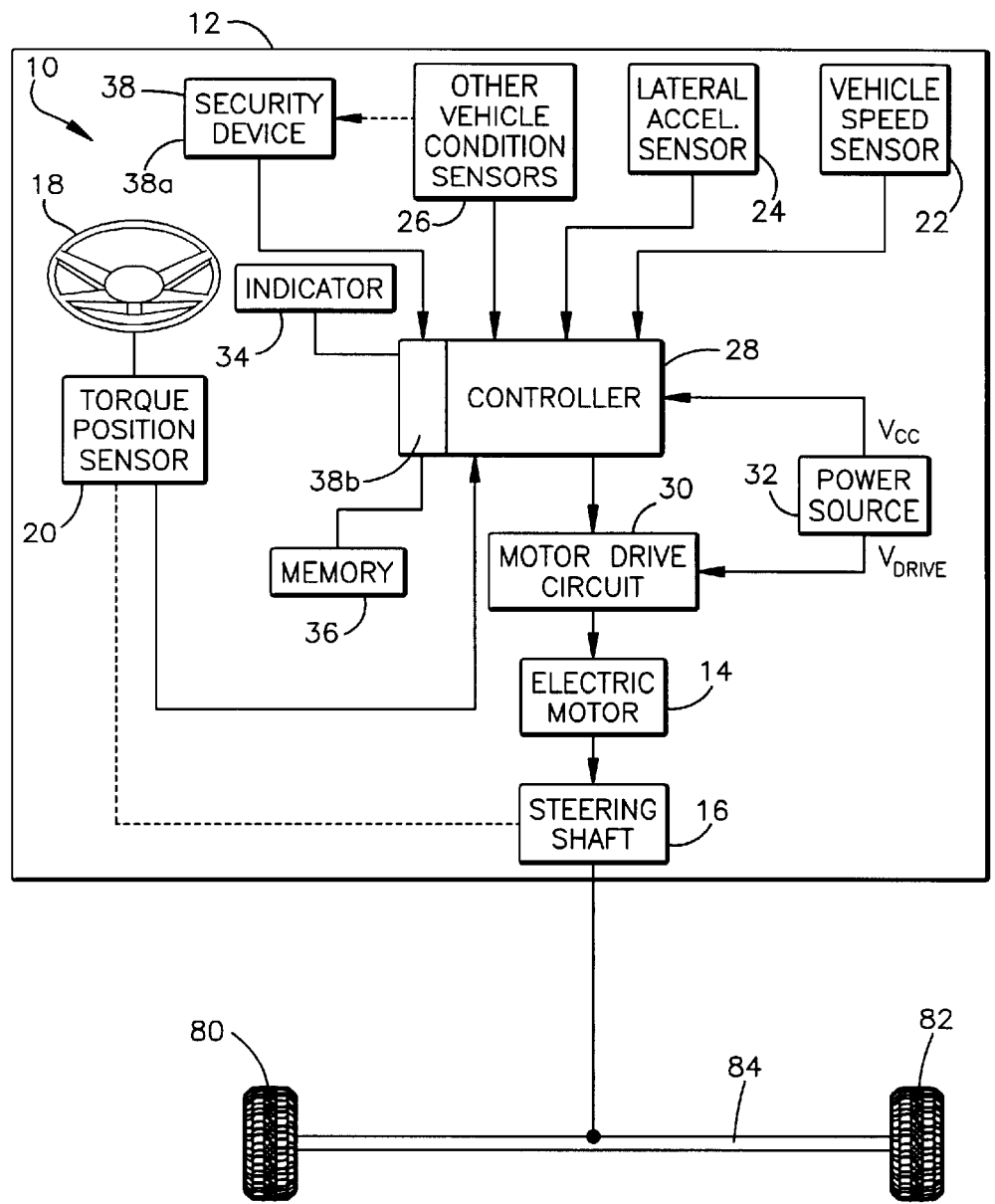
FIG. 7 is a schematic block diagram of a vehicle steering apparatus constructed in accordance with a second embodiment of the present invention.

FIG. 7 is a schematic block diagram of a vehicle steering apparatus 10 constructed in accordance with a second embodiment of the present invention. Structures in FIG. 7 that are similar to or are the same as structures in FIG. 1 have the same reference number as shown and described with reference to FIG. 1.

In the vehicle steering apparatus 10 of FIG. 7, the steering feel motor 14 is also a power assist motor. The vehicle 12 of FIG. 7 includes steerable wheels 80 and 82. A steering linkage, shown schematically at 84, is connected with the steerable wheels 80 and 82 and is also connected to the steering shaft 16. Rotation of the steering shaft 16 results in turning of steerable wheels 80 and 82.

The steering feel motor 14 is operatively connected to the steering shaft 16. Preferably, a gear assembly (not shown) connects an output of the steering feel motor 14 to the steering shaft 16.

FIG. 3, which was described in detail above, also illustrates an exemplary control process that may be performed by the vehicle steering apparatus 10 of FIG. 7 when operating in a drive mode. In response to the motor drive circuit 30 receiving a control signal from the controller 28, the steering feel motor 14 is energized to provide a power assist in turning of the steerable wheels.

Figure 8:
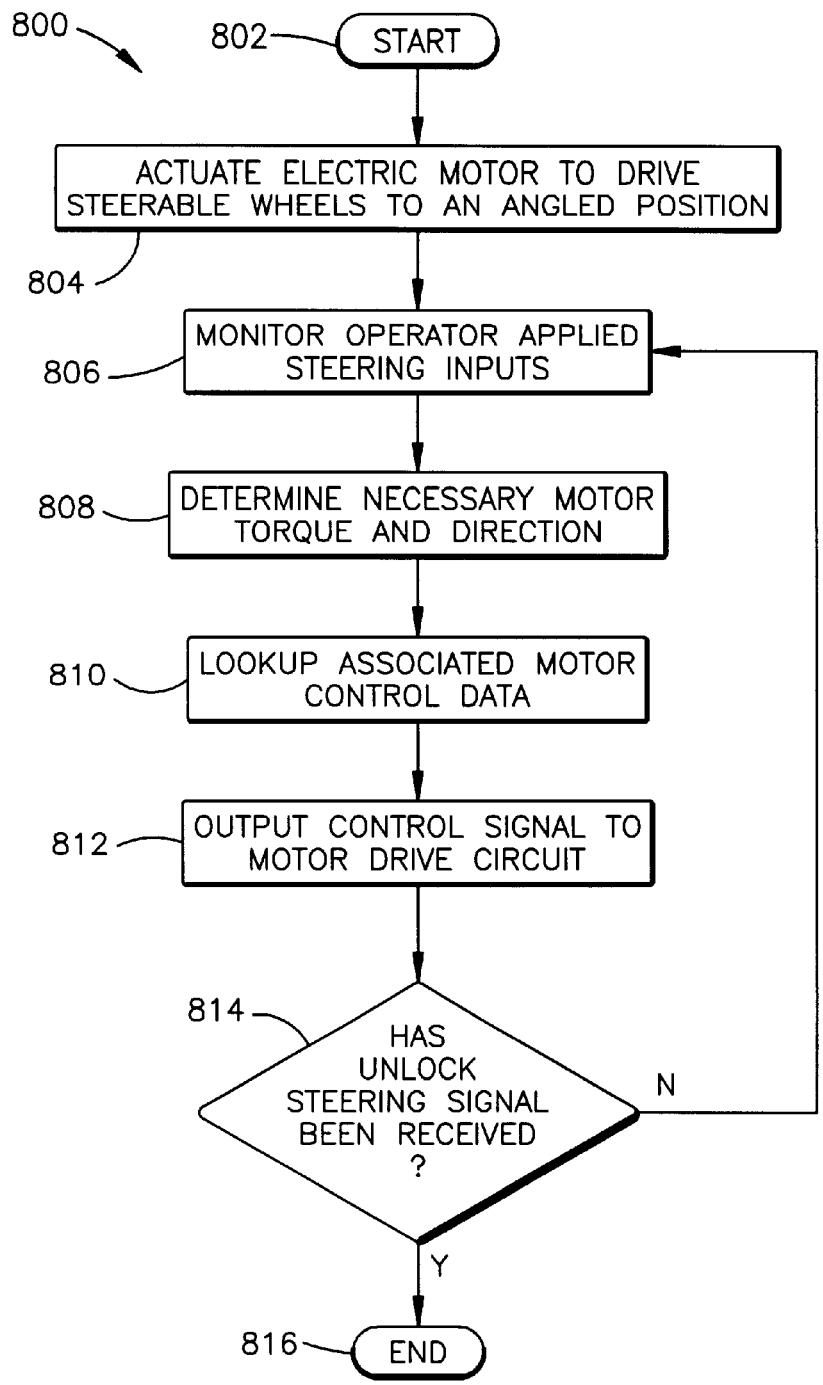
FIG. 8 is a flow diagram illustrating an exemplary control process performed by a steering apparatus of FIG. 7 when operating in a lock steering mode.

The flow diagram of FIG. 8 illustrates an exemplary control process 800 that may be performed by the controller 28 of the steering apparatus 10 of FIG. 7 when operating in the lock steering mode. The process 800 begins at step 802 in which the controller 28 is initialized, memories are cleared and set to initial values, flags are set to initial conditions, etc. At step 804, the steering feel motor 14, which is also a power assist motor, is actuated to drive the steerable wheels 80 and 82 to an angled position. For example, the angled position may be turning the steerable wheels completely to one side.

The process 800 proceeds to step 806 in which the controller 28 monitors the steering signal received from the torque/position sensor 20 to determine the operator applied steering inputs. At step 808, the controller 28 determines the steering feel motor torque and direction of applying the torque necessary to counterbalance all of the operator applied steering inputs. When counterbalancing the operator applied steering inputs, the steering feel motor torque and direction are sufficient prevent rotation of the steering shaft 16 away from the angled position.

The process 800 proceeds to step 810. At step 810, the controller 28 accesses the lock steering lookup table stored in memory 36 to determine motor control data associated with the determined steering feel motor 14 direction and torque necessary to counterbalance the driver applied steering inputs. In response to determining the associated motor control data, the controller 28, at step 812, outputs a control signal that includes the associated motor control data to the motor drive circuit 30.

The process 800 then proceeds to step 814 in which a determination is made as to whether the controller 28 has received the unlock steering signal from the security device 38. If the determination at step 814 is negative, the process 800 returns to step 806. If the determination at step 814 is affirmative, the process 800 proceeds to step 806 and the controller 28 exits the lock steering mode.

When the controller 28 is operating in the lock steering mode illustrated in FIG. 8, the control signal provided by the controller 28 controls the motor drive circuit 30 to provide the electrical energy necessary for the steering feel motor 14 to counterbalance all operator applied steering inputs and to prevent movement of the steerable wheels away from the angled position.

From the above description of the invention, those skilled in the art will perceive improvements, changes and modifications. Such improvements, changes and modifications within the skill of the art are intended to be covered by the appended claims.

Having described the invention, I claim the following:

1. A steering apparatus for a vehicle, the steering apparatus comprising:
   a handwheel;
   a steering feel motor operatively connected to the handwheel, the steering feel motor being operable to provide resistance to rotation of the handwheel for providing a steering feel to the handwheel;
   a sensor for detecting operator applied steering inputs to the handwheel and for outputting a steering signal indicative of the monitored operator applied steering inputs;
   a controller for receiving the steering signal and for, in response to the received steering signal, controlling energization of the steering feel motor for providing the steering feel; and
   a security device operatively connected to the controller and actuatable for providing a lock steering signal to the controller,
   the controller, in response to the lock steering signal, entering a lock steering mode in which the controller controls energization of the steering feel motor to counterbalance all operator applied steering inputs and thereby prevent steering of the vehicle.

2. The steering apparatus of claim 1 further including a vehicle condition sensor for sensing a condition of the vehicle and for providing a vehicle condition signal indicative of the sensed vehicle condition to the controller, the controller determining whether the vehicle condition signal indicates a predetermined vehicle condition and, in response to the lock steering signal, entering the lock steering mode after determining that the vehicle condition signal indicates the predetermined vehicle condition.

3. A steering apparatus for a vehicle, the steering apparatus comprising:
   a steering feel motor operatively connected to steering shaft of the vehicle;
   a sensor for detecting operator applied steering inputs to the steering shaft and for outputting a steering signal indicative of the monitored operator applied steering inputs;
   a controller for receiving the steering signal and for, in response to the received steering signal, controlling energization of the steering feel motor;
   a security device operatively connected to the controller and actuatable for providing a lock steering signal to the controller, the controller, in response to the lock steering signal, entering a lock steering mode in which the controller controls energization of the steering feel motor to counterbalance all operator applied steering inputs and thereby prevent steering of the vehicle; and
   a vehicle condition sensor for sensing a condition of the vehicle and for providing a vehicle condition signal indicative of the sensed vehicle condition to the controller, the controller determining whether the vehicle condition signal indicates a predetermined vehicle condition and, in response to the lock steering signal, entering the lock steering mode after determining that the vehicle condition signal indicates the predetermined vehicle condition,
   wherein the vehicle condition sensor is a vehicle speed sensor and the predetermined vehicle condition indicates that the vehicle is not in motion.

4. The steering apparatus as in claim 2 wherein the vehicle condition sensor is a vehicle ignition sensor for monitoring ignition of the vehicle and wherein the predetermined vehicle condition indicates that the ignition has been actuated into an on position.

5. The steering apparatus as in claim 1 wherein the security device includes structure adapted to receive a lock steering identification code, to compare the lock steering identification code received to a reference lock steering identification code, and to output the lock steering signal causing the controller to enter the lock steering mode in response to the reference lock steering identification code matching the received lock steering identification code.

6. The steering apparatus of claim 5 wherein the structure of the security device for receiving the lock steering identification code includes a keypad adapted to receive the lock steering identification code entered by an operator.

7. The apparatus as in claim 6 further including an indicator for prompting operator entry of the lock steering identification code and for indicating whether the received lock steering identification code matches the reference lock steering identification code.

8. The steering apparatus of claim 5 wherein the structure of the security device for receiving the lock steering identification code includes a receiver adapted to receive the lock steering identification code from a source remote from the vehicle.

9. The steering apparatus of claim 1 wherein the security device includes a code reader, the security device being adapted to provide the lock steering signal to the controller in the absence of an authorized key.

10. The steering apparatus of claim 5 wherein the structure of the security device is further adapted to receive an unlock steering identification code, to compare the received unlock steering identification code to a reference unlock steering identification code, and to provide an unlock steering signal, in response to the received unlock steering identification code matching the reference unlock steering identification code, to cause the controller to exit the lock steering mode.

11. The steering apparatus of claim 10 wherein the structure of the security device for receiving the unlock steering identification code includes a keypad adapted to receive the unlock steering identification code entered by an operator.

12. The apparatus as in claim 11 further including an indicator for prompting operator entry of the unlock steering identification code and for indicating whether the received unlock steering identification code matches the reference unlock steering identification code.

13. The steering apparatus of claim 10 wherein the structure of the security device for receiving the unlock steering identification code includes a receiver adapted to receive the unlock steering identification code from a source remote from the vehicle.

14. The steering apparatus of claim 1 further including a vehicle condition sensor for sensing a condition of the vehicle and for providing a vehicle condition signal indicative of the sensed vehicle condition to the security device, the security device, in response to the vehicle condition signal indicating a predetermined condition, providing the lock steering signal to the controller.

15. The steering apparatus of claim 14 wherein the security device includes structure adapted to receive an unlock steering identification code, to compare the received unlock steering identification code to a reference unlock steering identification code, and to provide an unlock steering signal to the controller, in response to the received unlock steering identification code matching the reference unlock steering identification code, causing the controller to exit the lock steering mode.

16. The steering apparatus of claim 15 wherein the structure of the security device includes a code reader adapted to receive the unlock steering identification code from an authorized key.

17. The steering apparatus of claim 15 wherein the structure of the security device for receiving the unlock steering identification code includes a keypad adapted to receive the unlock steering identification code entered by an operator.

18. The apparatus as in claim 17 further including an alphanumeric indicator for providing text messages for prompting operator entry of the unlock steering identification code and for indicating whether the received unlock steering identification code matches the reference unlock steering identification code.

19. The steering apparatus of claim 15 wherein the structure of the security device for receiving the unlock steering identification code includes a receiver adapted to receive the unlock steering identification code from a source remote from the vehicle.

20. A steering apparatus for a vehicle, the steering apparatus comprising:
a steering feel motor operatively connected to a steering shaft of the vehicle;
a sensor for detecting operator applied steering inputs to the steering shaft and for outputting a steering signal indicative of the monitored operator applied steering inputs;
a controller for receiving the steering signal and for, in response to the received steering signal, controlling energization of the steering feel motor; and
a security device operatively connected to the controller and actuatable for providing a lock steering signal to the controller,
the controller, in response to the lock steering signal, entering a lock steering mode in which the controller controls energization of the steering feel motor to counterbalance all operator applied steering inputs and thereby prevent steering of the vehicle,
wherein the steering feel motor is a power assist motor for helping to turn the vehicle steerable wheels, the controller, in response to the lock steering signal, actuating the steering feel motor to turn the steerable wheels to an angled position and thereafter controlling energization of the steering feel motor to counterbalance all operator applied steering inputs and thereby prevent movement of the steerable wheels from the angled position.

21. A method of operating a steering apparatus for a vehicle, the method comprising the steps of:
detecting operator applied steering inputs to a handwheel of the vehicle;
providing a steering signal that is indicative of the monitored operator applied steering inputs to a controller;
controlling, in response to the received steering signal, energization of a steering feel motor to provide resistance to rotation of the handwheel for providing a steering feel to the handwheel;
providing a lock steering signal, in response to actuation of a security device, to the controller; and
entering, in response to the lock steering signal, a lock steering mode in which the controller controls energization of the steering feel motor to counterbalance all operator applied steering inputs and thereby prevent steering of the vehicle.

22. The method of claim 21 further including the steps of:

sensing a condition of the vehicle and providing a vehicle condition signal indicative of the sensed vehicle condition;

determining whether the vehicle condition signal indicates a predetermined vehicle condition; and entering the lock steering mode, in response to the lock steering signal, after determining that the vehicle condition signal indicates the predetermined vehicle condition.

23. The method of claim 21 wherein the step of providing a lock steering signal, in response to actuation of a security device, to the controller comprises the steps of:

receiving a lock steering identification code;

comparing the lock steering identification code received to a reference lock steering identification code; and outputting the lock steering signal in response to the reference lock steering identification code matching the received lock steering identification code.

24. The method of claim 23 further including the steps of:

providing a text message on an alphanumeric indicator for prompting operator entry of the lock steering identification code; and indicating via text messaging on the alphanumeric indicator whether the received lock steering identification code matches the reference lock steering identification code.

25. The method of claim 23 further including the steps of:

receiving an unlock steering identification code;

comparing the received unlock steering identification code to a reference unlock steering identification code; and providing an unlock steering signal to the controller, in response to the received unlock steering identification code matching the reference unlock steering identification code, to cause the controller to exit the lock steering mode.

26. The method of claim 25 further including the steps of:

providing a text message on an alphanumeric indicator for prompting operator entry of the unlock steering identification code; and indicating via text messaging on the alphanumeric indicator whether the received unlock steering identification code matches the reference unlock steering identification code.

27. A method of operating a steering apparatus for a vehicle, the method comprising the steps of:

detecting operator applied steering inputs to a steering shaft;

providing a steering signal that is indicative of the monitored operator applied steering inputs to a controller;

controlling, in response to the received steering signal, energization of a steering feel motor;

providing a lock steering signal, in response to actuation of a security device, to the controller;

entering, in response to the lock steering signal, a lock steering mode in which the controller controls energization of the steering feel motor to counterbalance all operator applied steering inputs and thereby prevent steering of the vehicle;

actuating the steering feel motor to turn steerable wheels of the vehicle to an angled position; and thereafter controlling energization of the steering feel motor to counterbalance all operator applied steering inputs and thereby prevent movement of the steerable wheels from the angled position.

* * * * *